United States Patent [19]

Miyatake et al.

[11] Patent Number: 4,631,869
[45] Date of Patent: Dec. 30, 1986

[54] AUTOMATIC WORKPIECE ENGAGING APPARATUS IN GRINDING MACHINES

[75] Inventors: Satoshi Miyatake, Kawagoe; Mitsuo Abe, Kiyose; Masao Kume, Tokyo; Toshihide Ogasawara, Kawagoe; Hiroshi Umino, Sayama, all of Japan

[73] Assignee: Honda Giken Kogyo Kabushiki Kaisha, Japan

[21] Appl. No.: 638,690

[22] Filed: Aug. 8, 1984

[30] Foreign Application Priority Data

Aug. 9, 1983 [JP] Japan .................... 58-146022
Aug. 9, 1983 [JP] Japan .................... 58-146024

[51] Int. Cl.$^4$ .............................. B24B 49/00
[52] U.S. Cl. .................. 51/165.71; 51/95 GH; 409/15; 364/474; 318/685
[58] Field of Search ........... 51/95 R, 95 GH, 165.71, 51/165.72, 165 TP, 52; 409/12, 15; 364/474; 318/685

[56] References Cited

U.S. PATENT DOCUMENTS

| | | | |
|---|---|---|---|
| 3,152,422 | 10/1964 | Loxham | 51/95 GH |
| 3,204,532 | 9/1965 | Budnick | 409/15 |
| 4,178,537 | 12/1979 | Angst | 409/15 |
| 4,253,050 | 2/1981 | Angst | 51/95 GH |

FOREIGN PATENT DOCUMENTS

| | | | |
|---|---|---|---|
| 46587 | 4/1977 | Japan | 409/12 |
| 1378921 | 12/1974 | United Kingdom . | |

Primary Examiner—Harold D. Whitehead
Attorney, Agent, or Firm—Banner, Birch, McKie & Beckett

[57] ABSTRACT

An apparatus for automatically causing a workpiece to engage a rotary tool. A pulse signal generated by rotating a reference workpiece is stored, and then a pulse signal generated by rotating a mounted workpiece is counted. The counted pulse signal and the stored pulse signal are compared, and when they coincide with each other, the workpiece is brought into engagement with the rotary tool. When the rotary tool is shifted, the stored pulse signal information is updated, and then a pulse signal generated by rotating a mounted workpiece is counted. If the updated stored pulse signal information land the counted pulse signal information are equal to each other, then the workpiece is taken into engagement with the rotary tool.

13 Claims, 9 Drawing Figures

AUTOMATIC WORKPIECE ENGAGING APPARATUS IN GRINDING MACHINES

BACKGROUND OF THE INVENTION

The present invention relates to an automatic workpiece engaging apparatus for use in a grinding machine, and more particularly to an automatic workpiece engaging apparatus capable of automatically taking a workpiece or gear accurately into mesh with a grinding wheel having helical teeth, of preventing different types of workpieces from being ground, of detecting improper workpieces, and of automatically smoothly correcting any deviation from the workpiece of the grinding wheel when the latter is shifted to displace an effective area of a grinding edge thereof.

There has been employed in the art an apparatus for grinding a number of teeth of a workpiece such as a gear while in mesh with a grinding wheel having helical teeth on an outer peripheral surface thereof. No desired finished gear can be achieved unless the grinding wheel and the gear are rotated in synchronism since the gear teeth would not be ground uniformly by the grinding wheel in the absence of synchronous rotation of the grinding wheel and the gear. To rotate the grinding wheel and the gear in synchronism, the following relation has to be met:

> The number of r.p.m. of the grinding wheel×the number of teeth of the grinding wheel=the number of r.p.m. of the gear×the number of teeth of the gear.

For grinding a gear with a grinding wheel while meeting the above requirement, it has heretofore been necessary to manually bring the gear and the grinding wheel into initial mesh with each other at the time the gear and the grinding wheel are at rest. When it is desired to grind a number of gears of the same dimensions, the grinding wheel is required to be stopped each time a new gear has to be ground. The time required to stop the grinding wheel is lengthy and wasteful especially where the grinding wheel rotates at a high speed and has a large inertia. The prior procedure is also disadvantageous in that it does not lend itself to automatic continuous grinding operation.

When grinding a number of gears in succession, there is sometimes a tendency for different types of gears to be included in a batch of gears readied for grinding operation, such different gears having the same module but a different number of gear teeth, for example. If such different kinds of gears that cannot be discriminated at a glance are included and ground, they will not be properly ground and the overall grinding process will greatly be disrupted.

In conventional gear grinding machines of the screw roll type, it is customary to shift a grinding wheel in the direction of its own axis periodically for uniform utilization of all helical teeth on the grinding wheel. By shifting the grinding wheel, the position where it meshes with the gear is displaced so that the helical teeth on the grinding wheel will be prevented from localized damage. One problem with the prior grinding wheel shifting procedure is however that when the grinding wheel is shifted, there is developed a deviation between the grinding wheel and the gear, and they are not in proper mesh with each other.

SUMMARY OF THE INVENTION

The present invention has been made in an effort to obviate the various prior difficulties.

It is an object of the present invention to provide an automatic workpiece engaging apparatus capable of easily and reliably bringing a rotary grinding tool and a workpiece to be ground thereby into phase with each other, of confirming the type of a workpiece to be grounded and determining whether a workpiece itself is defective or not, and of easily adjusting or eliminating any phase deviation between the rotary grinding tool and the workpiece after the rotary grinding tool has been shifted with respect to the workpiece.

According to the present invention, there is provided an automatic workpiece engaging apparatus comprising a first rotational drive source, a first pulse generator operatively coupled to the first rotational drive source for generating pulses, a second rotational drive source, a second pulse generator operatively coupled to the second rotational drive source for generating pulses, a first counter for counting the pulses from the first pulse generator, a memory circuit connected to an output terminal of the counter for storing a count from the counter, and a comparator connected to an output terminal of the memory circuit for comparing a count from the counter for each workpiece rotated by the first rotational drive source or the second rotational drive source with a stored count from the memory circuit, to produce an output signal for controlling the second rotational drive source.

The automatic workpiece engaging apparatus also includes a divider connected to an output terminal of the first pulse generator, the second rotational drive source being controllable by an output signal from the divider and the output from the comparator.

The automatic workpiece engaging apparatus also includes an AND gate having an input terminal connected to an output terminal of the divider, the comparator having an output terminal connected to another input terminal of the AND gate, the AND gate being openable and closable by the output signal from the divider and the output signal from the comparator to control the second rotational drive source.

The automatic workpiece engaging apparatus further includes a divider to which an output terminal of the first pulse generator is connected, a first AND gate connected to an output terminal of the divider, and a second AND gate connected to another output terminal of the divider, the first and second AND gates being selectively openable by output signals from the divider and the comparator for controlling the second rotational drive source.

The divider frequency-divides pulses from the first pulse generator based on mutually different divisors, and supplies a control signal for the second rotational drive source selectively to the first and second AND gates.

The comparator compares the stored count from the counter with a count related to a new workpiece, issues an output signal to the first AND gate to control the second rotational drive source when the compared counts are substantially equal to each other, and issues an output signal to the second AND gate to control the second rotational drive source when the compared counts fail to be substantially equal to each other.

The automatic workpiece engaging apparatus includes a third rotational drive source for displacing a grinding tool or a workpiece coupled to the first or second rotational drive source, and a second counter connected to an output terminal of the comparator for supplying an output signal to the third rotational drive source in response to a signal indicative of substantially equal counts and applied from said comparator.

The first rotational drive source is coupled to a grinding tool and the second rotational drive source is coupled to the workpiece to be ground by the grinding tool.

The grinding tool comprises a grinding wheel and the workpiece comprises a gear.

The first pulse generator comprises a rotary encoder, the second pulse generator comprising a proximity sensor disposed in confronting relation to the gear and a waveform shaper connected to an output terminal of the optical sensor.

The automatic workpiece engaging apparatus includes a third counter having an input terminal connected to an output terminal of the second pulse generator, a third pulse generator operatively coupled to the second rotational drive source, and a second comparator connected to an output terminal of the third counter and having an output terminal connected to the first rotational drive source for supplying a de-energization signal to the first rotational drive source when a pulse count from the third counter and a reference value which are compared by the second comparator do not coincide with each other.

The automatic workpiece engaging also includes a display unit connected to an output terminal of the third counter.

The automatic workpiece engaging also includes a clutch mechanism mounted on a rotatable shaft extending from the second rotational drive source, the clutch mechanism being energizable and de-energizable in response to a shift signal which shifts the first rotational drive source.

The clutch mechanism comprises an electromagnetic clutch which is de-energizable by an automatic engaging signal for the first and second rotational drive sources and the shift signal.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
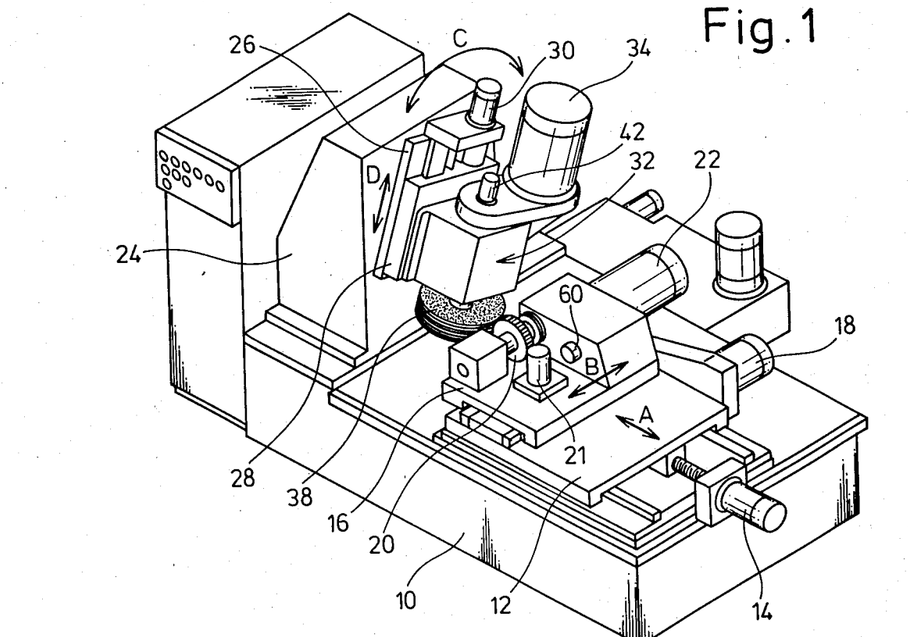
FIG. 1 is an isometric view of a gear grinding machine incorporating therein an automatic workpiece engaging apparatus according to the present invention.

FIG. 1 illustrates a gear grinding machine in which a workpiece engaging apparatus of the present invention is incorporated. The gear grinding machine includes a bed 10 supporting thereon a feed table 12 movable back and forth in the directions of the arrow A by means of a feed motor 14. A traverse table 16 is mounted on the feed table 12 and movable back and forth in the directions of the arrow B perpendicular to the directions of the arrow A by means of a traverse motor 18. A workpiece or gear 20 is detachably mounted on the traverse table 16, the workpiece 20 being rotatable by means of a workpiece spindle motor 22. A workpiece sensor 21 is also mounted on the traverse table 16 in the vicinity of the workpiece 20. The workpiece sensor 21 detects the number of teeth of the workpiece 20 rotated by the workpiece spindle motor 22.

Figure 2:
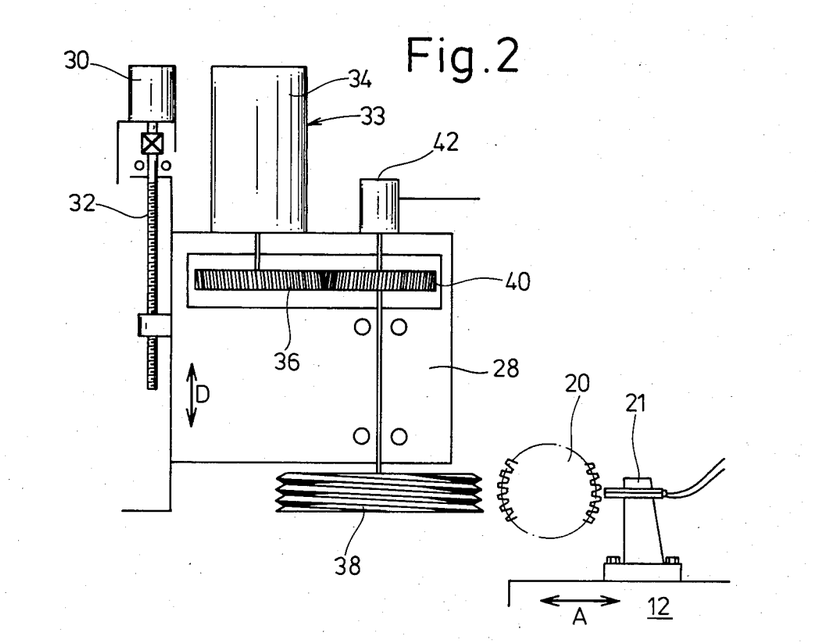
FIG. 2 is a fragmentary side elevational view showing the relative positional relationship between a grinding wheel and a gear in the gear grinding machine.

A column 24 is disposed on the bed 10 in a position aligned with the directions in which the feed table 12 is movable. The column 24 supports a turntable 26 mounted on a side wall surface thereof and turnable in the directions of the arrow C by a motor (not shown) housed in the column 24. A shift table 28 is movably mounted on the turntable 26. The shift table 28 is movable in the directions of the arrow D by a grinding wheel shifting motor 30 through a ball screw 32 threaded in the shaft table 28. The shift table 28 supports a grinding wheel spindle unit 33 thereon. As shown in FIG. 2, the grinding wheel spindle unit 33 is basically composed of a grinding wheel spindle motor 34, a first gear 36 rotatable by the motor 34, a second gear 40 meshing with the first gear 36 and having a shaft with a circular grinding wheel 38 mounted on one end thereof, and a first pulse generator 42 operatively coupled to the other end of the shaft of the second gear 40, the first pulse generator 42 comprising a rotary encoder. The grinding wheel 38 is of a circular configuration having several grooves or teeth defined on an outer peripheral surface thereof.

Figure 3:
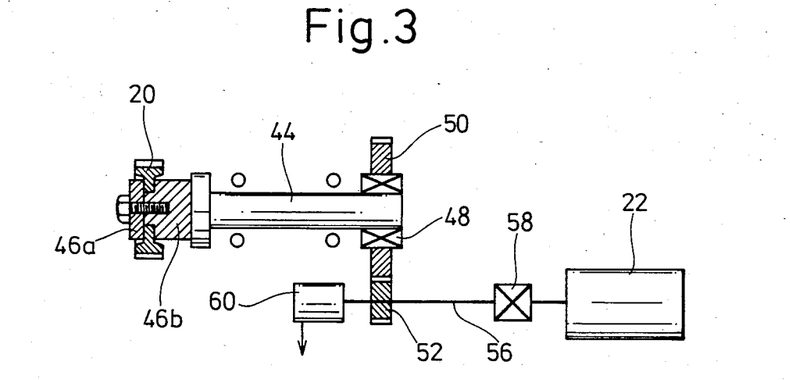
FIG. 3 is a plan view, partly in cross section, showing the relative positional relationship between the gear, a pulse generator, and a workpiece motor for driving them.

As illustrated in FIG. 3, the workpiece or gear 20 to be ground is detachably mounted on one end of a rotatable shaft 44 by means of a pair of clamps 46a, 46b, the shaft 44 supporting on the other end thereof a gear 50 of a relatively large diameter through an electromagnetic clutch 48. The gear 50 is held in mesh with a smaller-diameter gear 52 supported on a shaft 56 having one end connected by a coupling 58 to the workpiece spindle motor 22 and the other end to a second pulse generator 60.

Figure 4:
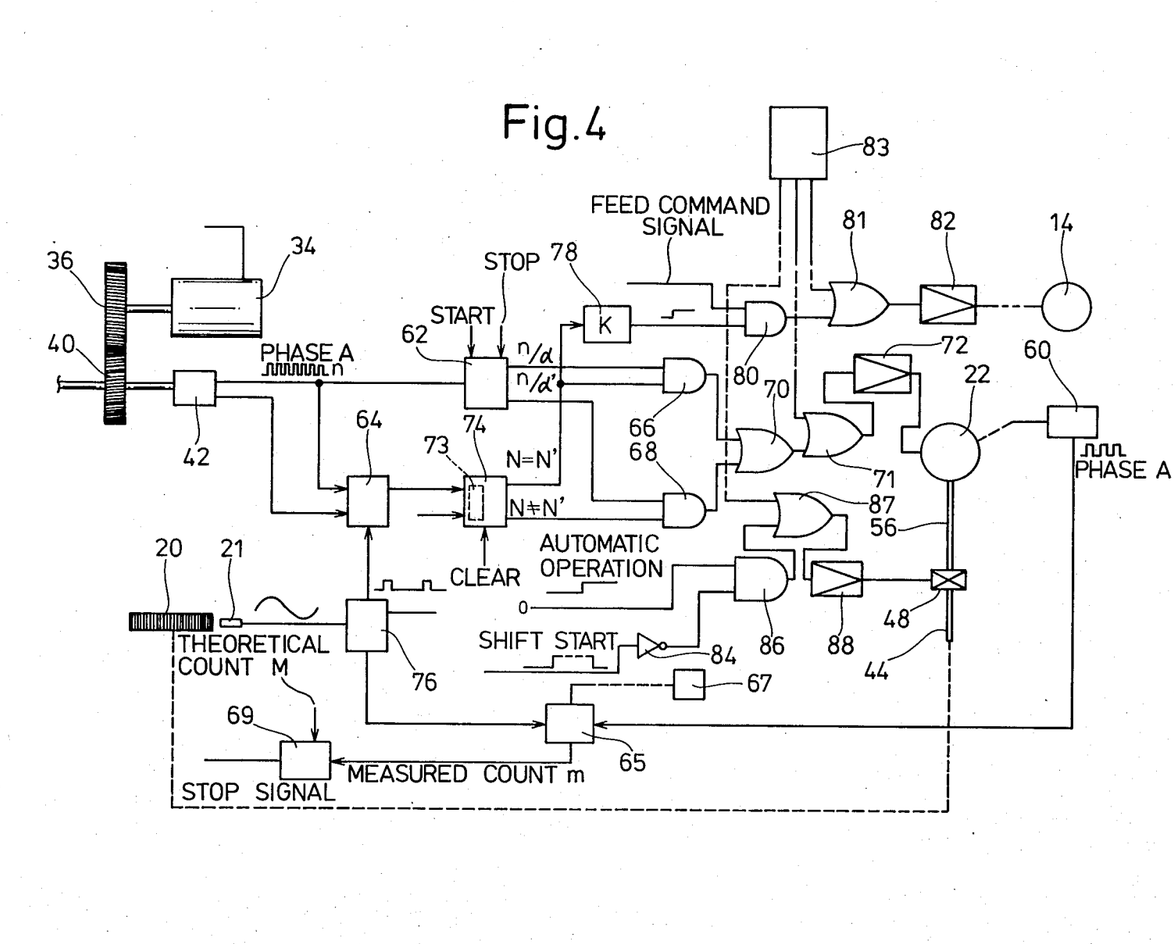
FIG. 4 is a block diagram of an electric circuit for phasing the grinding wheel and the gear, shifting the grinding wheel, and automatically meshing the grinding wheel and the gear.

An electronic circuit for operating an automatic workpiece engaging apparatus in the gear grinding machine thus constructed will be described with reference to FIG. 4.

The first pulse generator 42 in the grinding wheel unit 32 has an output terminal for issuing phase-A pulses, connected to an input terminal of a divider 62 and also to an input terminal of a counter 64. The divider 62 has an output terminal connected to an AND gate 66 and another output terminal to an AND gate 68. The AND gates 66, 68 have output terminals coupled to an OR gate 70 having an output terminal joined to an input terminal of a next OR gate 71, the output terminal of which is connected to an amplifier 72. An amplified output from the amplifier 72 is fed to the workpiece spindle motor 22.

The first pulse generator 42 has another 0-point output terminal connected to another input terminal of the counter 64, with its output terminal coupled to a comparator 74 having a memory 73 therein. The comparator 74 is supplied with an output from the counter 64, a memory clear signal, and a memory write signal. The counter 64 is supplied with an output from an waveform shaper 76 which shapes the waveform of an output from the workpiece sensor 21. The waveform shaper 76 has an output terminal connected to an input terminal of a counter 65 which has another input terminal connected to a second pulse generator or rotary encoder 60 coupled to the workpiece spindle motor 22. The counter 65 has an output terminal connected to a comparator 69. The counter 65 may have another output terminal connected to a display unit 67.

The comparator 74 has an output terminal connected to an input terminal of a counter 78 which is essentially a count checking counter. The counter 78 has an output terminal coupled to an input terminal of an AND gate 80 which has another input terminal supplied with a feed command signal for feeding the workpiece 20. The AND gate 80 has an output terminal connected to an input terminal of an OR gate 81, the output terminal of which is connected through an amplifier 82 to the feed motor 14. The output terminal of the comparator 74 is also connected to the AND gate 66. The comparator 74 has another output terminal coupled to the AND gate 68. The OR gates 71, 81 are supplied with signals from a manual controller 83. An inverter 84 for inverting a grinding wheel shifting signal has an output terminal connected to an input terminal of an AND gate 86, which has another input terminal supplied with a signal indicative of automatic meshing. The AND gate 86 has an output terminal connected via an OR gate 87 to an amplifier 88 which applies an amplified signal to the electromagnetic clutch 48. The OR gate 87 is supplied with a signal from the manual controller 83.

Operation of the automatic workpiece engaging apparatus in the gear grinding machine will hereinafter be described.

Initial phasing of the grinding wheel 38 and the gear 20 will be utilized to teach information on the gear to the apparatus at a later time when a number of identical gears are to be ground successively. Initial phasing will be described with reference to FIG. 5.

Figure 5:
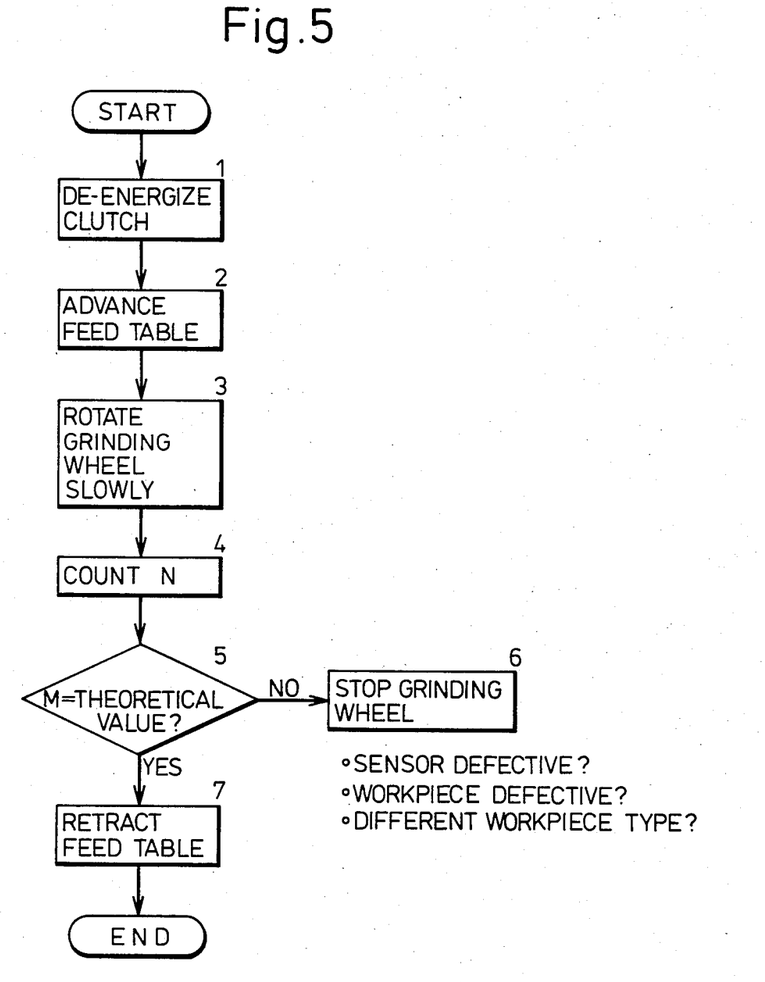
FIG. 5 is a flowchart of steps of operation for initial phasing.

First, no signal is supplied from the manual controller 83 to the OR gate 87, and hence the electromagnetic clutch 48 is de-energized in a step 1 (FIG. 5). As a result, the workpiece spindle 56 can be manually rotated. Then, a signal is supplied from the manual controller 83 to the other input of the OR gate 81 to energize the feed motor 14 for thereby advancing the feed table 12 in a step 2. At this time, the grinding wheel spindle motor 34 remains de-enerized, and the grinding wheel 38 is held at rest. Therefore, the grinding wheel 38 and the workpiece gear 20 can be brought into mesh with each other and easily be phased manually. The grindng wheel spindle motor 34 is then rotated at a low speed at a step 3. As a consequence, the gear 36 coupled to the grinding wheel spindle motor 34 is rotated to rotate the gear 40 held in mesh therewith. The rotation of the gear 40 causes the first pulse generator 42 to produce a 0-point pulse and phase-A pulses. As described above, when the grinding wheel spindle motor 34 is rotated at a low speed, the grinding wheel 38 is also rotated slowly, and the workpiece spindle motor 22 is caused to rotate by the workpiece gear 20 meshing with the grinding wheel 38. Since the workpiece gear 20 meshes with the grinding wheel 38, the workpiece gear 20 rotates in a direction opposite to the direction in which the grinding wheel 38 rotates.

Starting with the 0-point pulse from the first pulse generator 42, the phase-A pulses (N) generated therefrom are counted until an output pulse is produced by the workpiece sensor 21 at a step 4. More specifically, the phase-A pulses are introduced from the first pulse generator 42 to the counter 64, and also the 0-point pulse is fed from the first pulse generator 42 to the counter 64. The signal from the sensor 21 is shaped by the waveform shaper 76 into a pulse which is applied to the counter 64. The counter 64 continuously counts the phase-A pulses until the pulse form the waveform shaper 76 is applied. The count N is stored in the the memory 73 in the comparator 74. Phase-A pulses from the second pulse generator 60 after the first pulse output from the workpiece sensor 21 are counted by the counter 65 until a next pulse output is issued from the workpiece sensor 21. The counter 65 produces a count M.

The count M is given by the following equation:

$$M = 1/Z2 \times P2 \times T1/T2 \qquad (1)$$

where
Z2: the number of teeth of the workpiece gear 20;
T1: the number of teeth of the gear 50;
T2: the number of teeth of the gear 52;
P2: the number of phase-A pulses per cycle of the first pulse generator 60.

Therefore, the count M can be determined if the number of teeth Z2 of the workpiece gear 20 to be mounted on the workpiece spindle 44 is known. By arranging that the count M will be digitally displayed on the display unit 67 connected to the counter 65, a workpiece gear mounted on the workpiece spindle is judged as a different type of gear, or the workpiece sensor 21 is judged as malfunctioning, or a mounted workpiece gear is judged as defective when a measured count m displayed on the displayed unit 67 is different from the known or theoretical count M in a step 5.

If the counts m and M are different from each other, then the comparator 69 issues a stop signal to the grinding wheel spindle motor 34, and when the theoretical count M and the measured count m coincide and the pulse number M is completely counted, the grinding wheel spindle motor 34 is de-energized in a step 6, and at the same time the workpiece spindle motor 22 is stopped in synchronism with the grinding wheel spindle motor 34.

If the counts m and M coincide with each other, a signal is supplied from the manual controller 83 to the OR gate 81 to energize the feed motor 14 again to retract the feed table 12, thus completing the initial phasing in a step 7. When the initial phasing is completed, the circuits associated with the counter 65 and the comparator 69 are opened. At this time, the count N is stored in the memory 73 in the comparator 74. When the counts m and M differ from each other, the workpiece gear 20 is assumed to be a wrong gear, and should be dismounted from the workpiece spindle.

A process for automatically bringing the grinding wheel 38 and the workpiece gear 10 into mesh with other, using the count N stored in the memory 73 at the time of the initial phasing, will be described with reference to FIG. 6.

With the workpiece gear 20 mounted in place, the grinding wheel spindle motor 34 and the workpiece spindle motor 22 are energized for synchronous rotation. When the electromagnetic clutch 48 is actuated in a step 1, the workpiece gear 20 is rotated by the workpiece spindle motor 22 in a step 2. Under this condition, a signal is applied from the manual controller 83 through the OR gate 81 to energize the feed motor 14 to advance the feed table 12 gradually in a step 3. Immediately before the workpiece gear 20 and the grinding wheel 38 mesh with each other, the feed motor 14 is de-energized by the manual controller 83 for the reason that the workpiece gear 20 is normally out of phase with the grinding wheel 38 and such a phase deviation has to be eliminated.

Starting with a 0-point pulse from the first pulse generator 42, the number N' of phase-A pulses from the first pulse generator 42 is counted by the counter 64, and the count N' is fed to the comparator 74, which then compares the count N' with the stored count N in a step 4. If the counts N and N' are equal, then the workpiece gear 20 and the grinding wheel 38 are in phase, and the count N' is repeatedly checked K times by the counter 78 in a step 6. If each counting indicates the same count N', then the count signal from the counter 78 is applied to the AND gate 80 (FIG. 7). The checking the count K times is preferred especially when there is the danger of placing a different workpiece or gear in error for grinding operation. For example, it is assumed that a workpiece gear having (Z2+1) teeth is put in error in place of a workpiece gear having (Z2) teeth. Then, the following equations are established:

For a normal gear, $N'=N$.

For a gear having one more gear tooth than the normal gear, $$N' = N - P1 (K-1) 1/Z2 + 1 \quad (2)$$

where P1: the number of pulses per one revolution of the first pulse generator 42.

The difference between the pulses for the normal gear and the wrong gear is as follows:

$$\Delta = P1 (K-1) 1/Z2 + 1 \quad (3)$$

Provided P1 is 500, the teeth number Z2 is 50, and the count difference $\Delta$ is 10, $$K = 2.01$$

from the equation (3). Therefore, $N'=N$ can confirmed by three successive measurements with the counter 78.

Figure 6:
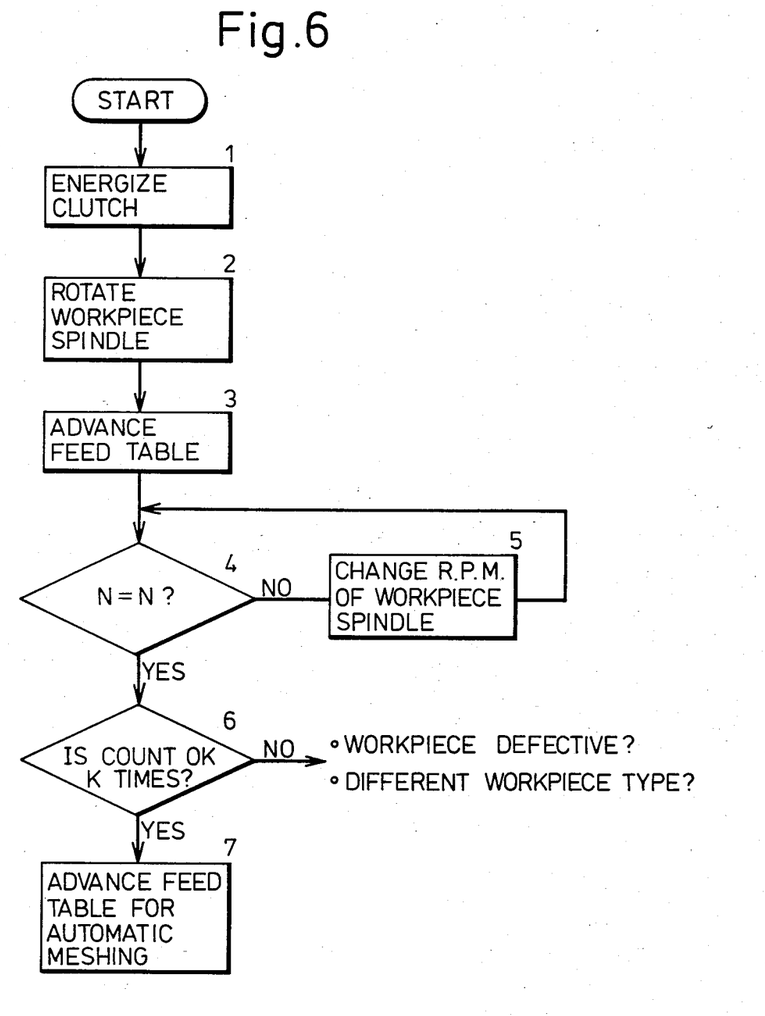
FIG. 6 is a flowchart of steps of operation for automatic meshing.
Figure 7:
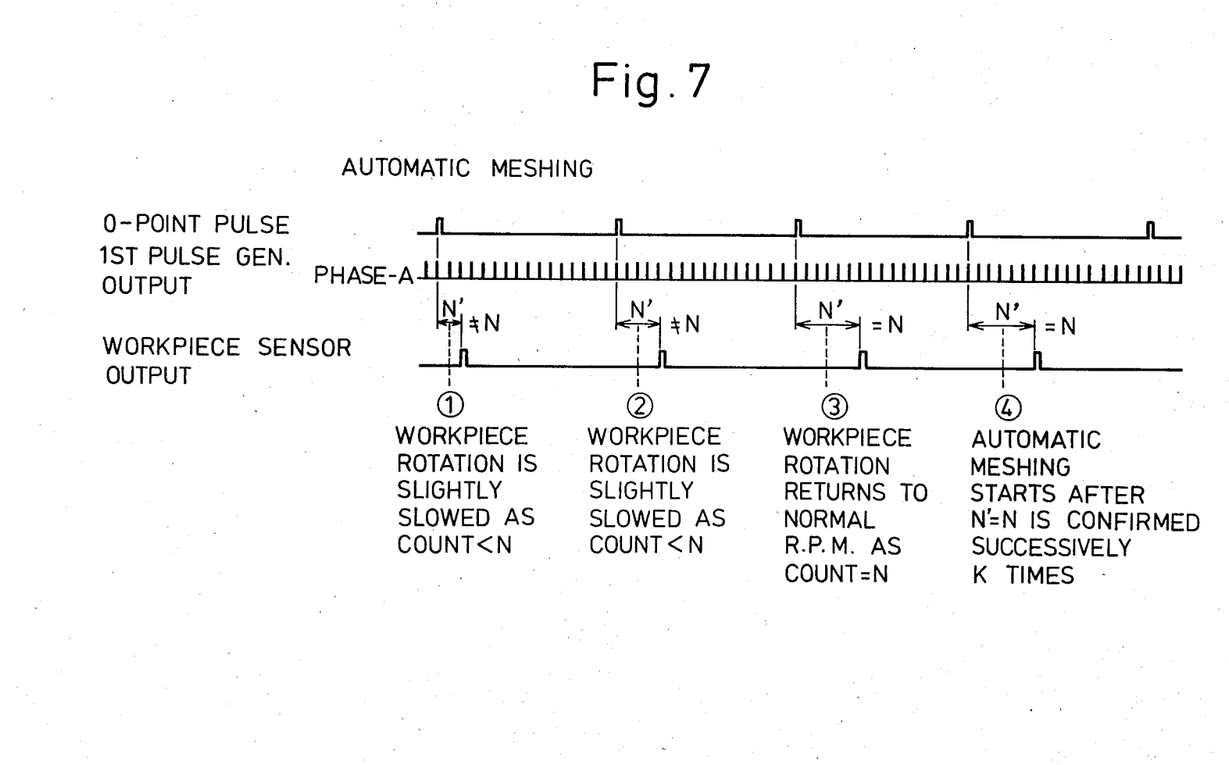
FIG. 7 is a timing chart for automatic meshing.

When the other input of the AND gate 80 is supplied with a feed command signal, the AND gate 80 is opened to allow the feed command signal to pass therethrough to the amplifier 82, which feeds an amplified signal to energize the feed motor 14 for thereby advancing the feed table 12 in a step 7 of FIG. 6.

The equal count signal is also delivered to the AND gate 66 which is also supplied with an output signal from one of the output terminals of the divider 62. The divider 62 issues outputs indicative of the phase-A pulses as divided by divisors $\alpha$ and $\alpha'$ at all times to the AND gates 66, 68, respectively. The divisor $\alpha$ is a determined value at the time there is no phase deviation between the grinding wheel 38 and the workpiece gear 20, and the divisor $\alpha'$ is a determined value at the time there is a phase deviation between the grinding wheel 38 and the workpiece gear 20. At this time, the rotational signal n/$\alpha$ at a period free from any phase deviation is applied, so that the AND gate 66 is opened to allow the signal to be applied through the OR gates 70, 71 and the amplifier 72 to rotate the workpiece spindle motor 22 in synchronism with the grinding wheel spindle motor 34 to enter a normal mode of grinding operation.

If the counts N' and N are not equal to each other, then the grinding wheel 38 and the workpiece gear 20 are out of phase with each other. The unequal count signal from the comparator 74 is fed to one of the input terminals of the AND gate 68, the other input thereof being supplied with the phase-deviation signal n/$\alpha'$ from the divider 62. The AND gate 68 is opened to pass the signal n/$\alpha'$ through the OR gates 70, 71 and the amplifier 72 to the workpiece spindle motor 22 for increase or reduce the number of r.p.m. of the workpiece motor 22 commensurate with the value N' in a step 5. If N' is smaller than N, for example, then the rotation of the workpiece spindle motor 22 is slightly slowed (see (1) and (2) in FIG. 7). Such a correction is repeated until finally the count N' is substantially equalized to the count N, whereupon the grinding wheel 38 and the workpiece gear 20 rotate in phase with each other (see (3) and (4) in FIG. 7). More specifically, the AND gate 66 is supplied with an n/$\alpha$ signal from the divider 62 and a signal of N=N' from the comparator 74, and produces an output signal which opens the OR gates 70, 71 to cause the motor 22 to rotate the workpiece gear 20 in synchronism with the grinding wheel 38, whereupon the workpiece gear 20 rotates in phase with the grinding wheel 38. Since N=N' at this time, the signal from the comparator 74 is applied to the counter 78 which checks the count K times, and thereafter the feed motor 14 is energized in the manner described above.

Figure 8:
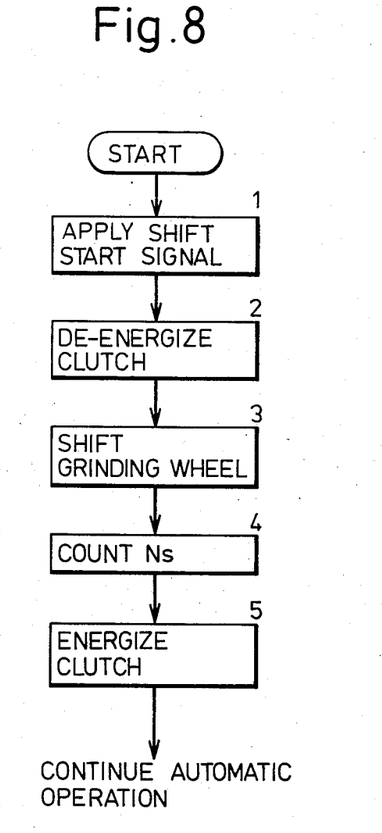
FIG. 8 is a flowchart of steps of operation for shifting the wheel.

A process for shifting the grinding wheel 38 to displace an effective area of a grinding edge thereof will be described with reference to FIG. 8

In this mode of operation, automatic operation of the apparatus is stopped. A grinding wheel shift start signal is applied from the manual controller 83 to the inverter 84, which inverts the applied signal to close the AND gate 86, thus de-energizing the electromagnetic clutch 48 in steps 1 and 2. More specifically, the output signal from the inverter 84 is inverted in response to a rising edge of the grinding wheel shift start signal, to close the AND gate 86 which is supplied at one of the input terminals with an automatic meshing signal, thereby de-energizing the amplifier 88. As a result, the workpiece gear 20 is no longer positively rotated by the workpiece spindle motor 22 but rotated with the rotation of the grinding wheel 42.

Figure 9:
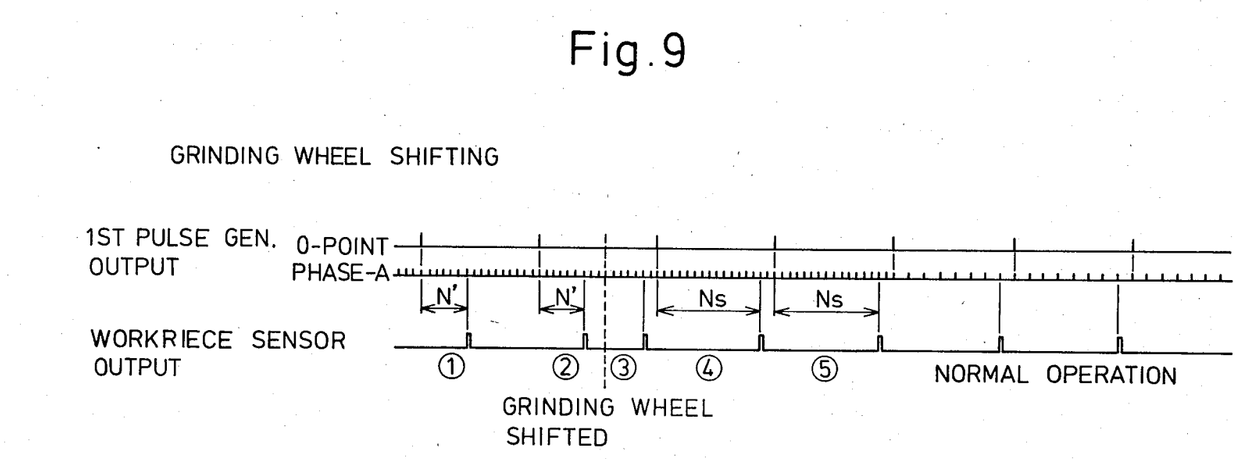
FIG. 9 is a timing chart for shifting the grinding wheel.

Then, the grinding wheel 42 is shifted a suitable interval in a step 3 (see (3) in FIG. 9). More specifically, the shift motor 30 is energized to rotate the ball screw 32 to move the shift table 28 for shifting the grinding wheel 38. At this time, the workpiece gear 20 is in mesh with the grinding wheel 38, and hence is brought out of phase with the grinding wheel 38 as the latter is shifted.

Now, the clear signal clears the prior pulse number N in the memory 73, and starting with a new 0-point pulse from the first pulse generator 42, phase-A pulses therefrom are counted by the counter 64 until an output pulse from the workpiece sensor 21 is applied through the waveform shaper 76 to the counter 64. The counter 64 produces a new phase-A pulse count Ns in a step 4 (see (4) and (5) in FIG. 9). The count Ns is then stored in the memory 73 in place of the count N based on the write signal.

While the count Ns is stored in the memory 73, the clutch 48 remains de-energized. When the shift start signal from the manual controller 83 becomes "0" in level after the grinding wheel 38 has been shifted, the signal is inverted by the inverter 84 into a signal of a level "1", which is fed to one of the input terminals of the AND gate 86. Since the other input terminal of the AND gate 86 is supplied with the automatic operation signal, the AND gate 86 is opened to pass the signal to the amplifier 88, which then energizes the electromagnetic clutch 48 in a step 5. Therefore, rotative power of the workpiece spindle motor 22 which is rotated by a new synchronizing signal is transmitted to the workpiece gear 20. The grinding wheel 38 now starts grinding the workpiece gear 20 with a new grinding edge.

With the arrangement of the present invention, there are detected pulses indicative of rotation of the grinding wheel and pulses generated by the sensor disposed in the vicinity of the workpiece gear and indicative of the gears of the workpiece gear, and the pulses related to the grinding wheel are counted until a rising edge of the pulses related to the workpiece gear is reached, and the stored count will be utilized as information on the rotation of a next workpiece gear to be ground. Therefore, initial phasing of the grinding wheel and the workpiece gear to be ground thereby can easily be achieved for synchronous rotation of the grinding wheel and the workpiece gear. Furthermore, the types of workpiece gears to be grounded in succession can easily be confirmed, and whether workpiece gears to be ground are defective or not can also easly be checked. Accordingly, the grinding efficiency is improved and successively ground workpice gears of good quality can be obtained in a short period of time. Any phase deviation produced between the grinding wheel and the workpiece gear at the time the grinding wheel is shifted to cause a new grinding edge to mesh with the the gear can be eliminated by correcting the stored pulse information related to the grinding wheel and the stored pulse information related to the workpiece gear, and the clutch for the workpiece motor is energized on the basis of the corrected information for accomplishing a new cycle of synchronous operation. As a consequence, the grinding edge on the grinding wheel can quite easily be shifted with respect to the grinding gear, so that the grinding wheel will be efficiently utilized and have an increased service life, and it will not be necessary to precisely measure the interval that the grinding wheel is shifted.

While the invention has been particularly shown and described with respect to a preferred embodiment thereof, it will be understood by those in the art that various changes in form and detail may be made therein without departing from the spirit and scope of the present invention.

What is claimed is:

1. An apparatus for automatically engaging a workpiece and a tool, each having preformed grooves, said apparatus comprising:
   (a) a first rotational drive source operatively coupled to the tool to rotate the tool;
   (b) a first pulse generator operatively coupled to said first rotational drive source to generate proportional to the speed of rotation of the tool and to generate a reference pulse at every complete rotation of the tool;
   (c) a second rotational drive source controllable by a comparison control signal and operatively coupled to the workpiece to rotate the workpiece;
   (d) a second pulse generator disposed in a confronting relation to the workpiece for generating a pulse at every passage of a workpiece groove near said second pulse generator:
   (e) a first counter operatively coupled to said first and said second pulse generators for counting a reference count and a subsequent count, said reference count being the number of pulses generated from said first pulse generator during the interval between said reference pulse generated from said first pulse generator and said pulse generated from said second pulse generator to which a reference workpiece is confronted, said subsequent count being the number of pulses generated from said first pulse generator during the interval between said reference pulse generated from said first pulse generator and a pulse generated from said second pulse generator to which a subsequent workpiece is confronted;
   (f) a memory circuit operatively coupled to an output terminal of said first counter for storing said reference count; and
   (g) a first comparator operatively coupled to an output terminal of said first counter and an output terminal of said memory circuit for comparing a subsequent count from said first counter for each subsequent workpiece rotated with said reference count from said memory circuit, outputting the comparison control signal based on said comparison for controlling said second rotational drive source.

2. An automatic workpiece engaging apparatus according to claim 1, including a divider connected to an output terminal of said first pulse generator, said second rotational drive source being controllable by an output signal from said divider and the output from said first comparator.

3. An automatic workpiece engaging apparatus according to claim 2, including an AND gate having an input terminal connected to an output terminal of said divider, said first comparator having an output terminal connected to another input terminal of said AND gate, said AND gate being openable and closable by the output signal from said divider and the output signal from said first comparator to control said second rotational drive source.

4. An automatic workpiece engaging apparatus according to claim 1, including a divider to which an output terminal of said first pulse generator is connected, a first AND gate connected to an output terminal of said divider, and a second AND gate connected to another output terminal of said divider, said first and second AND gates being selectively openable by output signals from said divider and said first comparator for controlling said second rotational drive source.

5. An automatic workpiece engaging apparatus according to claim 4, wherein said divider frequency-divides pulses from said first pulse generator based on mutually different divisors, and supplies a control signal for said second rotational drive source selectively to said first and second AND gates.

6. An automatic workpiece engaging apparatus according to claim 5, wherein said first comparator compares said reference count with a subsequent count from a subsequent workpiece, outputting a signal to said first AND gate to control said second rotational drive source when the compared counts are substantially equal to each other, and outputting a signal to said second AND gate to control said second rotational drive source when the compared counts are not substantially equal to each other.

7. An automatic workpiece engaging apparatus according to claim 6, including a third rotational drive source for displacing a tool or a workpiece coupled to said first or second rotational drive source respectively, and a second counter connected to an output terminal of said first comparator for supplying an output signal to said third rotational drive source in response to a signal indicative of substantially equal counts and output from said first comparator.

8. An automatic workpiece engaging apparatus according to claim 1, wherein the tool comprises a grinding wheel and the workpiece comprises a gear.

9. An automatic workpiece engaging apparatus according to claim 8, wherein said first pulse generator comprises a rotary encoder, said second pulse generator comprises a proximity sensor and a waveform shaper connected to an output terminal of said proximity sensor.

10. An automatic workpiece engaging apparatus according to claim 1, including a second counter having an input terminal connected to an output terminal of said second pulse generator, a third pulse generator operatively coupled to said second rotational drive source, and a second comparator connected to an output terminal of said second counter and having an output terminal connected to said first rotational drive source for supplying a de-energization signal to said first rotational drive source when a pulse count from said second counter and a predetermined reference value which are compared by said second comparator do not coincide with each other.

11. An automatic workpiece engaging apparatus according to claim 10, including a display unit connected to an output terminal of said second counter.

12. An automatic workpiece engaging apparatus according to claim 1, including a clutch mechanism mounted on a rotatable shaft extending from said second rotational drive source, said clutch mechanism being energizable and de-energizable in response to a shift signal which shifts said first rotational drive source.

13. An automatic workpiece engaging apparatus according to claim 12, wherein said clutch mechanism comprises an electromagnetic clutch which is de-energizable by an automatic engaging signal for said first and second rotational drive sources and said shift signal.

* * * * *

UNITED STATES PATENT AND TRADEMARK OFFICE
CERTIFICATE OF CORRECTION

PATENT NO. : 4,631,869

DATED : December 30, 1986

INVENTOR(S) : Satoshi Miyatake et al.

It is certified that error appears in the above-identified patent and that said Letters Patent is hereby corrected as shown below:

Column 9, line 68, after "generate" insert —pulses—.

Signed and Sealed this

Twenty-eighth Day of April, 1987

Attest:

DONALD J. QUIGG

*Attesting Officer*   *Commissioner of Patents and Trademarks*